United States Patent
Poncelet

(12) 
(10) Patent No.: US 6,663,965 B2
(45) Date of Patent: Dec. 16, 2003

(54) THERMO-REVERSIBLE MATERIAL AND METHOD FOR PREPARING IT

(75) Inventor: Olivier J. Poncelet, sur Saone (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/170,609

(22) Filed: Jun. 12, 2002

(65) Prior Publication Data

US 2003/0018136 A1 Jan. 23, 2003

Related U.S. Application Data

(63) Continuation-in-part of application No. 09/587,868, filed on Jun. 6, 2000, now abandoned.

(30) Foreign Application Priority Data

Jul. 30, 1999 (FR) .............................. 99 10148

(51) Int. Cl.$^7$ .................. C03C 17/34; C04B 41/83; C08J 5/12
(52) U.S. Cl. .................... 428/411; 428/913; 427/407.2; 523/213; 523/212
(58) Field of Search ................. 428/441, 913; 427/407.2; 523/212, 213

(56) References Cited

U.S. PATENT DOCUMENTS

| | | | |
|---|---|---|---|
| 4,683,258 A | | 7/1987 | Itoh et al. |
| 5,196,099 A | * | 3/1993 | Mori et al. ............... 204/182.8 |
| 5,432,245 A | | 7/1995 | Roberts et al. |
| 5,929,214 A | * | 7/1999 | Peters et al. ................. 530/417 |
| 5,997,961 A | * | 12/1999 | Feng et al. ................. 427/515 |
| 6,022,330 A | * | 2/2000 | Chen et al. ..................... 602/8 |
| 6,447,897 B1 | * | 9/2002 | Liang et al. ................. 428/441 |

FOREIGN PATENT DOCUMENTS

| | | |
|---|---|---|
| EP | 0 534 016 A1 | 3/1993 |
| EP | 0 599 150 A1 | 6/1994 |
| JP | 05154958 | 6/1993 |
| WO | WO 98/29461 | 7/1998 |

* cited by examiner

Primary Examiner—D. R. Wilson
(74) Attorney, Agent, or Firm—Doreen M. Wells

(57) ABSTRACT

The invention concerns thermo-reversible materials.

A material according to the invention comprises a support having grafted thereon a layer of a thermo-reversible polymer that can change from a hydrophilic state to a hydrophobic state depending on the temperature. This material can be used for the decontamination of aqueous effluents.

3 Claims, 1 Drawing Sheet

THERMO-REVERSIBLE MATERIAL AND METHOD FOR PREPARING IT

CROSS-REFERENCE TO A RELATED APPLICATION

This is a continuation-in-part of application Ser. No. 09/587,868, filed Jun. 6, 2000, now abandoned, titled "Thermo-Reversible Material And Method For Preparing It" by Olivier J. Poncelet.

FIELD OF THE INVENTION

The present invention relates to a material that can be either hydrophilic or hydrophobic depending on the temperature, and to a method for obtaining said material. The present invention also relates to the use of this material for the decontamination of effluents and waste waters.

BACKGROUND OF THE INVENTION

Substances displaying temperature-dependent hydrophilic or hydrophobic characteristics are known, such as thermo-reversible polymers.

Thermo-reversible polymers can shift from an initial state to a final state by either heating or cooling, depending on the initial state of the polymer. Thermo-reversible polymers, above a phase transition temperature called the Lower Critical Solution Temperature (LCST), change from a hydrophilic state to a hydrophobic state. These polymers posses a hydrophilic moiety and a hydrophobic moiety.

These polymers can find various applications, particularly for effluent decontamination.

Conventionally, for such applications, the thermo-reversible polymers can be adsorbed on suitable supports, made of glass, plastics or metal. This adsorption does not afford stable or permanent deposits or layers, i.e., a thermo-reversible polymer adsorbed on a support will not adhere sufficiently on that support.

Thermo-reversible polymers can also be polymerized in situ on a support. For example, the surface of a support can be impregnated with a monomer solution, and then this monomer can be polymerized, as described by K. Ista et al. in Applied and Environmental Biology, 1999, page 1603, or in Feng U.S. Pat. No. 5,997,961. Feng discloses a method of attaching poly(N-isopropylacrylamide) to glass surfaces which comprises the steps of (1) reacting a photosensitizer attached to a trimethoxysilane with a glass surface, and (2) photopolymerizing a N-isopropylacrylamide onto this glass surface, in the presence of a cross-linking agent. However, this method does not guarantee the adhesion and stability of the polymer layer obtained, nor does it allow a high degree of control over the properties of the polymer itself (e.g., its molecular weight, or its polydispersity, and thus its physical or mechanical properties). Besides, the use of a cross-linking agent prevents from obtaining linear chain of poly(N-isopropylacrylamide).

The use of these thermo-reversible polymers thus raises difficulties, which could be overcome by establishing a stable binding between the thermo-reversible polymers and a support, without adversely affecting the thermo-reversibility of the polymers.

It would therefore be desirable to be able to fix the polymer to the support so as to overcome the difficulties stated above.

SUMMARY OF THE INVENTION

The object of the present invention is a method that allows to obtain the grafting of a thermo-reversible polymer onto a support, in particular by a reaction that generates covalent bonds between the thermo-reversible polymer and the support.

A further object of the invention is a material that have temperature-dependent hydrophilic and hydrophobic characteristics and comprises a support having grafted thereon a layer of a thermo-reversible polymer thereon preferably by means of at least one covalent bond.

The method of the invention comprises a grafting step which is performed by means of an intermediate bonding compound that comprises (i) a first function able to react with the surface OH of the inorganic support and form with them a covalent bond, and (ii) a second function able to react with an end-function of the thermo-reversible polymer and form with it a covalent bond. The grafting method of the invention thus comprises a first step in which the inorganic support is allowed to react with at least one intermediate bonding compound, and a second step in which the support treated in first step is allowed to react with an end-function of a thermo-reversible polymer wherein the thermo-reversible polymer, (i) results from the polymerization of a monomer of formula:

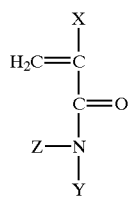

where X is H or $HO_2CH_3$; Z and Y each represent hydrogen or a linear or branched, substituted or unsubstituted alkyl group of from 1 to 6 carbon atoms, Z and Y can be combined to form a substituted or unsubstituted heterocycle and 2 and Y cannot be both hydrogen;

(ii) has an end-function which is capable to react with the intermediate bonding compound; and (iii) has a weight average molar mass ($M_w$) in the range of from 500,000 to 2,000,000.

DETAILED DESCRIPTION OF THE INVENTION

Figure 1:
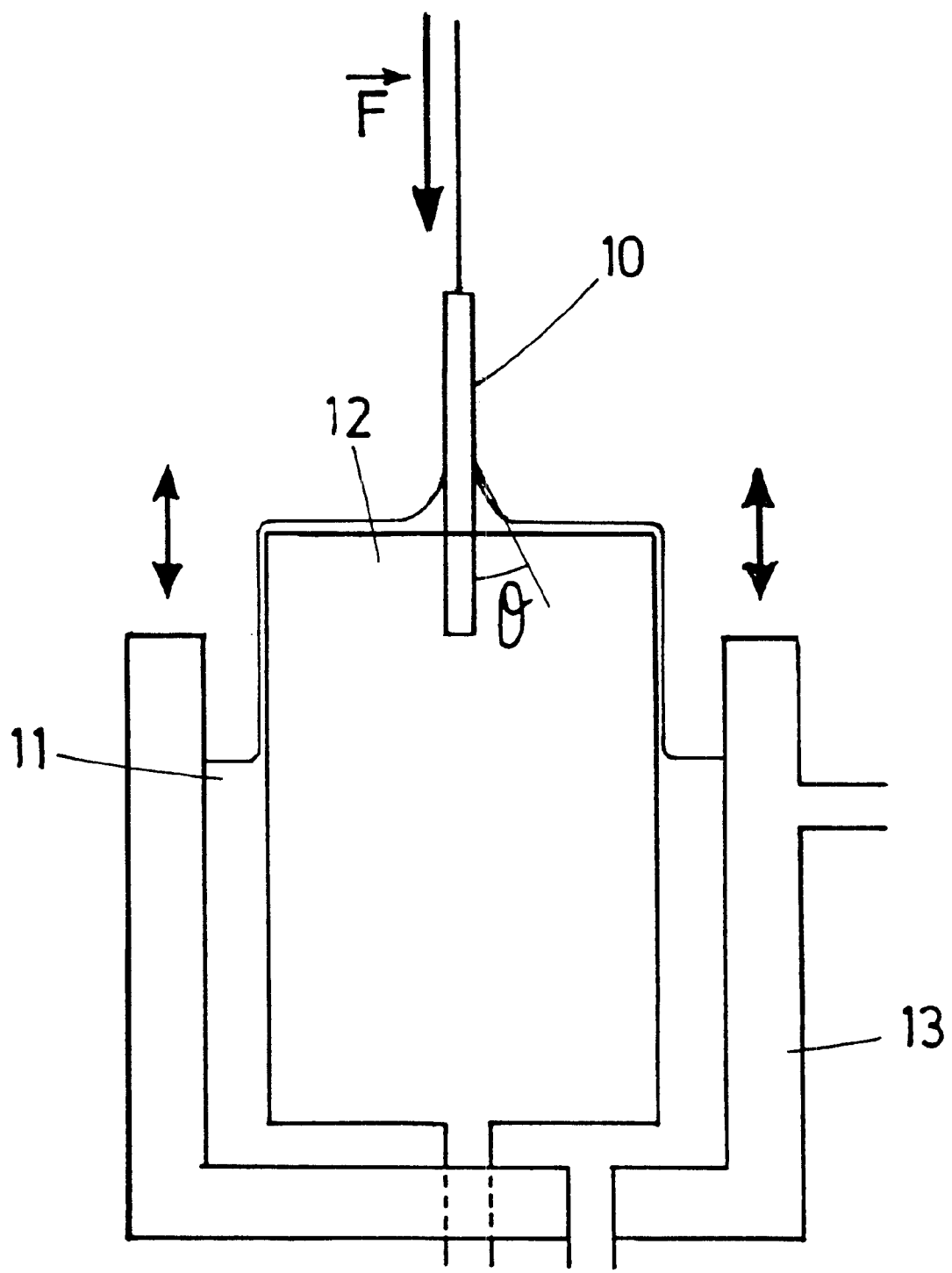
FIG. 1 depicts a device to measure the wetting angle of an element made up of a support bearing a grafted layer of thermo-reversible polymer.

The thermo-reversible polymers used in accordance with this invention, are described in Macromol Chem. Phys. 199, 137, pages 1387–1392 by G. Bokias et al (1998). They result from the polymerization of monomers of the formula;

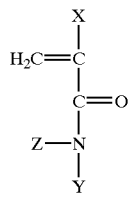

where X is H or $CH_3$, Z and Y are H or a linear or branched, alkyl group containing from 1 to 6 atoms of carbon, a cycloalkyl group containing from 3 to 7 carbons, or an aryl group containing from 6 to 10 carbons, Z and Y cannot both be H, and Z and Y can be combined to form a nitrogen-containing heterocycle.

In one embodiment, the thermo-reversible polymer is a polymer or copolymer of N-alkylmethacrylamide or N-alkylacrylamide, which has a weight average molar mass in the range of from 500,000 to 2,000,000 where the alkyl group is a linear or branched alkyl group containing from 1 to 6 atoms of carbon, such as methyl, ethyl, n-propyl, isopropyl, n-butyl, etc. The weight average molar mass ($M_w$) of the polymers is measured by size exlusion chromatography as indicated by G. Bokias et al in Macromol. Chem. Phys. 199, 1387–92 (1998).

In addition, the thermo-reversible polymers used in the invention have a end-function F that allows them to be reacted with an intermediate bonding compound which has been grafted onto the support having surface OH groups. Thus, the grafting procedure comprises the step of (1) reacting the intermediate bonding compound with the surface OH groups of the support and (2) the end-function of the polymer. The end-function of the thermo-reversible polymer can be the amino function of the N-alkylacrylamide or N-alkylmethacrylamide, or a substituent on the polymer that can react with the intermediate compound, such as a primary amino, a carboxy, a thiol function, or the like.

The poly-N-alkylacrylamide-type polymers used in the invention have preferably a low LCST. Above this temperature, they are hydrophobic and contract in water. Below this temperature, they hydrate and become hydrophilic (hydrogels). By low LCST is meant a temperature between 20° C. and 70° C., preferably between 30° C. and 40° C.

One consequence of the above is that the initial properties of the polymer are conditioned by the temperature at which the polymerization was carried out. If the polymerization is carried out at a temperature above the LCST, an opaque hydrophobic polymer is obtained. If the polymerization is carried out below the LCST, a transparent hydrogel (hydrophilic gel) is obtained. When as it is heated to above the LCST, this initially transparent gel contracts and becomes opaque and hydrophobic.

A poly(N-isopropylacrylamide) can for example be obtained in the following way, described by Tanaka and Fillmore in J. Chem. Phys. 70(03), Feb. 1, 1979, or by G. Bokias et al., in Macromol. Chem. Phys., 199, 1387–92 (1998). A monomer is dissolved in osmosed degassed water. To this solution is added a cross-linking agent such as N,N'-methylenebisacrylamide or dihydroxyethylenebisacrylamide, a polymerization initiator or accelerator, such as sodium persulfate, 2,2-azobis-isobutyronitrile, tetramethylethylenediamine, ammonium peroxodisulfate or sodium metabisulfite type.

A radical polymerization reaction yields the polymer in a few minutes. Combinations of two or more initiators can preferably be used, such as a combination of sodium peroxodisulfate and tetramethylethylene diamine, or a combination of ammonium peroxodisulfate and sodium metabisulfite. Such combinations allow better control over the molecular weight and make it possible to carry out the synthesis at a temperature below the LCST and thereby directly obtain the polymer in a hydrophilic form. In one embodiment, the monomer solution is placed in contact with the solution containing the initiator and the cross-linking agent. The resulting polymer should have a weight average molar mass within the range specified above.

According to the invention, the intermediate bonding compound is any suitable reagent able to generate a covalent bond with both the surface OH of the support and the end-function F of the thermo-reversible polymer as indicated above, e.g. amino, carboxy, diol. For example, the intermediate bonding compound can be a chlorosilane of formula $Cl_xSi(R^1Cl)_{4-x}$, where $R^1$ is an alkylene group containing from 1 to 10 atoms of carbon, an arylene group, an alkarylene group, or an aralkylene group with an alkylene radical containing from 1 to 6 atoms of carbon and x is equal to 1, 2 or 3, or a chloroalkyl group. With a chlorosilane of formula $Cl_3SiR^1Cl$ as indicated above, a first covalent bond can be formed between the $SiCl_3$ radicals and the surface OH groups of the support, and a second covalent bond between the radical $R^1Cl$ and the end-function of the thermo-reversible polymer. Examples of intermediate bonding compounds are $Cl_3Si(CH_2)_3Cl$, $Br_3Si(CH_2)_3Br$, $Cl_3Si(CH_2)_4Cl$; $Cl_3SiCH_2CH=CH_2Cl$; chloroalkylphosphates, or chloroalkylphosphinates.

$CH_3$

The support can be any inorganic substance that possesses the required mechanical properties and the surface functions to allow the subsequent grafting. Suitable supports are in particular those that possess surface OH functions, for example glass (silica), silico-aluminate, alumina, titanium, zirconium or germanium oxide supports.

After the grafting, the material according to the invention is believed to comprise an inorganic support having covalently bonded thereon groups having the structure —O-Link-P— wherein P represents the radical of the thermo-reversible polymer as defined above and link the radical of the bonding compound. According to an embodiment, the bonding radical Link can have the formula

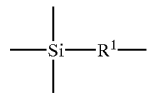

wherein $R^1$ represents an alkylene radical of from 1 to 10 carbon atoms, an arylene group, an alkarylene group, or an aralkylene group as defined above. According to a further embodiment, the inorganic support has also grafted thereon

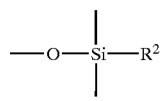

where $R^2$ represents an alkyl group of from 1 to 10 carbon a fluoro alkyl group or a perfuloroalkyl group.

In a preferred embodiment of the invention, the support is made of glass or silicon, the surface of which comprises an oxidation layer rich in OH functions. Such a surface layer can be obtained for example by the oxidation of the support in the ambient atmosphere. The support is then allowed to react with an intermediate bonding compound. For example, with a chlorosilane, the following set of reactions is believed to take place:

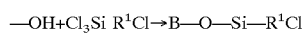

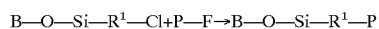

where $R^1$ is as defined above and P is the radical of the thermo-reversible polymer.

In another embodiment, the support can be allowed to react with a mixture comprising (1) the intermediate bonding compound as defined above and (2) a second compound able to react with the support, but inert towards the polymer. The amount of this second compound is determined so that only a part of the surface OH groups of the support will be reacted with this compound. Alternatively, an amount of this compound can be reacted with the support before the support is reacted with the intermediate bonding compound. In this way, the quantity of grafted thermo-reversible polymer and the hydrophobic characteristics of the material can be controlled. The second compound, that is inert towards the thermo-reversible polymer, bears a function able to react with the surface OH groups of the support by forming a covalent bond, but bears no function able to react with the thermo-reversible polymer. For instance, the second compound bears a hydrophobic end group. This second compound can have the formula $Cl_3SiR^2$ or $Br_3SiR^2$, where $R^2$ is an alkyl group containing 1 to 10 atoms of carbon, a fluoroalkyl or perfluoroalkyl group, for example a trifluoroalkyl group containing 1 to 10 atoms of carbon, an aralkyl group, a cycloalkyl group or an aryl group.

The material of the invention can be used for effluent decontamination. In an embodiment, the material of the invention can be used for the extraction of organic substances present an aqueous effluent, so that this effluent can be recycled or discarded.

EXAMPLE 1

Preparation of Poly(N-isopropyl)acrylamide with a Terminal Amino Group

In 200 ml of water was dissolved 20 g of N-isopropylacrylamide (NIPAM) (0.9 M solution) at 27° C., with moderate stirring, and a stream of argon was bubbled through the solution for 1 h 30 min.

The following were prepared:

(1) a solution of 0.41 g of cysteamine chloride in 3 ml of water (2 mole % relative to NIPAM), and (2) a solution of 0.82 g of ammonium peroxodisulfate in 3 ml of water (2 mole % relative to NIPAM).

Solution (1) was added to the NIPAM solution, followed 5 minutes later by solution (2).

Polymerization was carried out under an argon atmosphere with stirring at 27° C.

After 4 hours, the reaction medium was placed in a dialysis bag (6000 D), which was immersed in a 16-liter tank fed with running water. The dialysis was carried out for 12 hours and the solution was then gelled and freeze-dried.

The polymer obtained had a weight average molar mass ($M_w$) of 1,000,000 measured by SEC chromatography as indicated above. A 1 M solution of this polymer in water was prepared. The thermo-reversibility of the polymer was checked by visual examination. The LCST, measured by visual examination was 33° C. The visual examination was conducted as follows: A solution of 0.5 g of polymer was made up in water. This solution was transparent at ordinary temperature. When the solution was heated to above the LCST it became opaque. The thermo-reversibility was additionally checked by Raman spectrography: when the polymer reached a temperature greater than the LCST, the CH bond peak was shifted towards lower $cm^{-1}$ values.

EXAMPLE 2

The polymer obtained in example 1 was grafted onto a glass plate in the following way.

A glass plate (25×25×1 mm) was dipped in chloroform and then water to clean it. It was then dried and dipped in a 1:3 mixture by volume of hydrofluoric acid and water. The plate was rinsed and dried. The purpose of the hydrofluoric acid treatment is to form OH groups on the glass surface.

Under an argon atmosphere was prepared a solution of 0.4 ml of a mixture of 33% (p-chloromethyl) phenyltrichlorosilane and 67% trifluorodecyltrichlorosilane in 120 ml of anhydrous chloroform (molar ratio 1:1).

The two solutions above were mixed under an argon atmosphere, and the glass plate, conditioned as described above, was soaked in the mixture for two minutes. Infrared analysis showed that the plate had about twice as many (p-chloromethyl)phenyl)Si sites as (trifluorodecyl)Si sites. The glass plate was then immersed for between 15 minutes and 2 hours in a solution of 2 g of the polymer prepared in example 1. It was then rinsed with chloroform. The reversible polymer grafted onto the glass through the silane intermediate was then tested to make sure its thermo-reversible properties were conserved, by measuring the water wetting angle versus temperature.

When the temperature increased between 30 and 40° C., so exceeding the LCST (33° C.), the wetting angle increased from 82 to 94°, thus indicating that the polymer had become hydrophobic. Numerous successive temperature cycles could be performed. The results for the wetting angle are set out in Table I.

EXAMPLE 3

The operating procedure of example 2 was followed except that the glass plate was immersed in a solution of 0.5 g of (p-chloromethyl)phenyltrichlorosilane in 120 ml of water. A glass plate was obtained that had only [(p-chlorophenyl)phenyl]Si sites, according to the operating procedure of example 2. The water wetting angle remained constant at 88° when the glass plate was heated from 30° C. to 40° C., i.e., to above the LCST.

The results for the wetting angle are set out in Table I.

Measurement of the Wetting Angle

This is a dynamic measurement of the wetting angle carried out by the method of Wilhemy described by Adamson in Forces interfaciales en milieux aqueux, by C. J. Van Oss, Editions Masson, Paris, 1996.

As shown in FIG. 1, the plate (10) is suspended vertically just above the liquid (11) contained in an overflow vessel (12). The weight of the plate is measured and transmitted to a chart recorder that is not depicted. The whole set-up is placed in a thermostat tank (13). The vessel (12) is moved vertically upwards. When the plate comes into contact with the liquid, a weak additional force F, positive or negative, is exerted, and a variation in the weight of the plate is transmitted to the chart recorder, which records a deviation that is proportional to the wetting angle θ. The surface tension is deduced from θ using the formula $\gamma=\Delta W p \cos\theta$, where $\Delta W$ is the variation in weight of the plate and P is the perimeter of the plate.

TABLE I

| Material | $\theta_1$ | $\theta_2$ |
| --- | --- | --- |
| Cleaned glass | 17 | 17 |
| Glass treated with silane* | 88 | 88 |
| Glass with grafted polymer | 82° | 94° |

*(p-chloromethyl)phenyltrichlorosilane $\theta_1$=wetting angle at 30° C. in water $\theta_2$=wetting angle at 40° C. in water The Δθ=θ₁−θ₂ difference is 12° in water for the glass with grafted polymer, which is indicative of the hydrophobic change at the LCST between 30 and 40° C.

What is claimed is:

1. A material comprising an inorganic support having surface OH groups, said support having grafted thereon a layer of a thermo-reversible polymer having a phase transition temperature designated as the Lower Critical Solution Temperature (LCST) and being hydrophilic below the LCST and hydrophobic above the LCST, wherein the thermo-reversible polymer results from the polymerization of a monomer of formula:

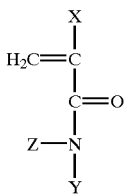

where X is hydrogen or CH₃, Z and Y each represent of hydrogen or a straight-chain or branched alkyl group containing from 1 to 6 atoms of carbon. Z and Y can be combined to form a heterocycle, and Z and Y cannot both be hydrogen, wherein said thermo-reversible polymer has an end-function that allows it to be grafted onto said inorganic support having surface OH groups, and wherein the inorganic support has further grafted thereon groups of formula

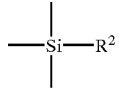

where R² is an alkyl group of from 1 to 10 carbon atoms, or a trifluoroalkyl group of from 1 to 10 carbon atoms.

2. The material of claim 1, wherein said thermo-reversible polymer is grafted on said inorganic support by groups having the structure: -O-Link-P, where P represents the radical of the thermo-reversible polymer and Link is a radical of a bonding compound.

3. The material of claim 1 wherein the support is made of a material selected from the group consisting of silica, silico-aluminate, alumina, titanium oxide, zirconium oxide or germanium oxide.

* * * * *